US012313989B2

(12) United States Patent
Yamashita

(10) Patent No.: US 12,313,989 B2
(45) **Date of Patent: *May 27, 2025**

(54) FIXING DEVICE AND IMAGE FORMING APPARATUS

(71) Applicant: FUJIFILM Business Innovation Corp., Tokyo (JP)

(72) Inventor: Takayuki Yamashita, Ebina (JP)

(73) Assignee: FUJIFILM Business Innovation Corp., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/437,725

(22) Filed: Feb. 9, 2024

(65) Prior Publication Data

US 2024/0184232 A1 Jun. 6, 2024

Related U.S. Application Data

(63) Continuation of application No. 17/961,175, filed on Oct. 6, 2022, now Pat. No. 11,940,745, which is a (Continued)

(30) Foreign Application Priority Data

Mar. 12, 2019 (JP) ................................ 2019-044949

(51) Int. Cl.
*G03G 15/20* (2006.01)
*G03G 15/00* (2006.01)

(52) U.S. Cl.
CPC ......... *G03G 15/2017* (2013.01); *G03G 15/20* (2013.01); *G03G 15/2064* (2013.01); *G03G 15/6511* (2013.01)

(58) Field of Classification Search
CPC ............... G03G 15/2017; G03G 15/20; G03G 15/2064; G03G 15/6511
See application file for complete search history.

(56) References Cited

U.S. PATENT DOCUMENTS 9,291,970 B1 3/2016 Kawahata et al.
2007/0280758 A1 12/2007 Ciaschi et al.
(Continued)

FOREIGN PATENT DOCUMENTS

EP 1 953 598 A1 8/2008
JP 2000-321922 A 11/2000
(Continued)

OTHER PUBLICATIONS

Oct. 1, 2019 International Search Report issued in International Patent Application No. PCT/JP2019/032291.
(Continued)

*Primary Examiner* — Stephanie E Bloss
*Assistant Examiner* — Michael A Harrison
(74) *Attorney, Agent, or Firm* — Oliff PLC

(57) ABSTRACT

A fixing device includes: a heating section that heats in a non-contact manner a front surface of a recording medium; a feeding section that feeds the recording medium while causing the front surface to be opposed to the heating section; and a maintaining section that, in order to enable the recording medium to be fed by the feeding section while a rear surface that is opposite to the front surface, and that is in an image region where an unfixed-image is formed on the front surface is in a non-contact state, maintains the non-contact state.

9 Claims, 10 Drawing Sheets

Related U.S. Application Data continuation of application No. 17/358,079, filed on Jun. 25, 2021, now Pat. No. 11,493,864, which is a continuation of application No. PCT/JP2019/032291, filed on Aug. 19, 2019.

(56) References Cited

U.S. PATENT DOCUMENTS

| | | | | |
|---|---|---|---|---|
| 2008/0181685 | A1 | 7/2008 | Shimatsu | |
| 2012/0268751 | A1* | 10/2012 | Ishida ................ | G03G 15/6573 358/1.1 |
| 2012/0315070 | A1* | 12/2012 | Harashima ........... | G03G 15/235 399/341 |
| 2014/0205308 | A1 | 7/2014 | Kamoda et al. | |
| 2016/0070212 | A1 | 3/2016 | Kamoda et al. | |
| 2019/0171138 | A1* | 6/2019 | Yoshie ............... | G03G 15/2039 |

FOREIGN PATENT DOCUMENTS

| | | | |
|---|---|---|---|
| JP | 2002-148973 | A | 5/2002 |
| JP | 2006259223 | A | 9/2006 |
| JP | 2009-163065 | A | 7/2009 |
| JP | 2011-039148 | A | 2/2011 |
| JP | 5333023 | B2 | 11/2013 |
| JP | 2016-057371 | A | 4/2016 |
| JP | 2017-219717 | A | 12/2017 |
| JP | 2018-197831 | A | 12/2018 |
| WO | 2005/059658 | A1 | 6/2005 |

OTHER PUBLICATIONS

Oct. 1, 2019 Written Opinion issued in International Patent Application No. PCT/JP2019/032291.

Mar. 29, 2022 Office Action issued in Japanese Application No. 2021-505486.

Nov. 21, 2022 Extended European Search Report issued in European Application No. 19919325.1.

Sep. 19, 2023 Office Action issued in Japanese Patent Application No. 2022-134302.

Jul. 6, 2023 Office Action issued in Chinese Patent Application No. 201980091713.4.

Jan. 25, 2024 Office Action issued in Australian Patent Application 2023202384.

* cited by examiner

FIXING DEVICE AND IMAGE FORMING APPARATUS

CROSS REFERENCE TO RELATED APPLICATIONS

This application is a continuation of U.S. application Ser. No. 17/961,175, filed Oct. 6, 2022, which is a continuation of U.S. application Ser. No. 17/358,079, filed Jun. 25, 2021, which is a continuation of International Application No. PCT/JP2019/032291 filed on Aug. 19, 2019, and claims priority from Japanese Patent Application No. 2019-044949 filed on Mar. 12, 2019, the contents of which are incorporated herein by reference.

BACKGROUND

Technical Field

The present invention relates to a fixing device and an image forming apparatus.

Related Art

Patent Literature 1 discloses a configuration where a transfer member is fed by a feeding member configured by an endless wire, and an unfixed toner image transferred to the transfer member is thermally fused by radiation heat.

CITATION LIST

Patent Literature

[Patent Literature 1] JP-A-2002-148973

SUMMARY

In the case where a feeding section that is in contact with the rear surface of a recording medium such as a sheet is used as a feeding section that feeds the recording medium in a heating section which heats in a non-contact manner the front surface of the recording medium, the feeding section is gradually heated with the operation of the heating section, and the rear surface of the recording medium is heated by the heated feeding section. With respect to the degree by which the rear surface of the recording medium is heated by the feeding section, the degree in the initial stage of the operation of the heating section is different from that in a stage where the operation of the heating section is continued. Therefore, the control of the heating temperature of the heating section is sometimes complicated.

Aspects of non-limiting embodiments of the present disclosure relate to reduce the influence of heat that is received from the rear surface of a recording medium when the recording medium is fed while the front surface is opposed to a heating section, as compared with the case where the rear surface in an image region of the recording medium is in contact with a component of a device. Aspects of non-limiting embodiments of the present disclosure relate to reduce the influence of heat that is applied to a fixed image on the rear surface of the recording medium, as compared with a configuration where the rear surface of the recording medium to which the image is fixed is in contact with a component of the device. Aspects of non-limiting embodiments of the present disclosure relate to reduce the influence of heat that is received from the rear surface of the recording medium when the recording medium is fed while the front surface is opposed to the heating section, as compared with a configuration where a no-wind condition in which air is not blown to the rear surface of the recording medium is produced. Aspects of non-limiting embodiments of the present disclosure relate to feed the recording medium to a pressurizing section with enabling the influence of heat that is received from the rear surface of the recording medium, to be reduced as compared with a configuration where, when the recording medium is fed while the front surface is opposed to the heating section, the front-end side of the recording medium is not held and is in a free state.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a fixing device including: a heating section that heats in a non-contact manner a front surface of a recording medium; a feeding section that feeds the recording medium while causing the front surface to be opposed to the heating section; and a maintaining section that, in order to enable the recording medium to be fed by the feeding section while a rear surface that is opposite to the front surface, and that is in an image region where an unfixed-image is formed on the front surface is in a non-contact state, maintains the non-contact state.

BRIEF DESCRIPTION OF DRAWINGS

Exemplary embodiment(s) of the present invention will be described in detail based on the following figures, wherein.

DETAILED DESCRIPTION

Hereinafter, an exemplary embodiment of the invention will be described with reference to the drawings. The arrow H shown in the figures indicates the vertical direction or the upward and downward direction of an apparatus, the arrow W indicates the horizontal direction or the width direction of the apparatus, and the arrow D indicates the anteroposterior direction (depth direction) of the apparatus.

(Image Forming Apparatus 10)

Figure 1:
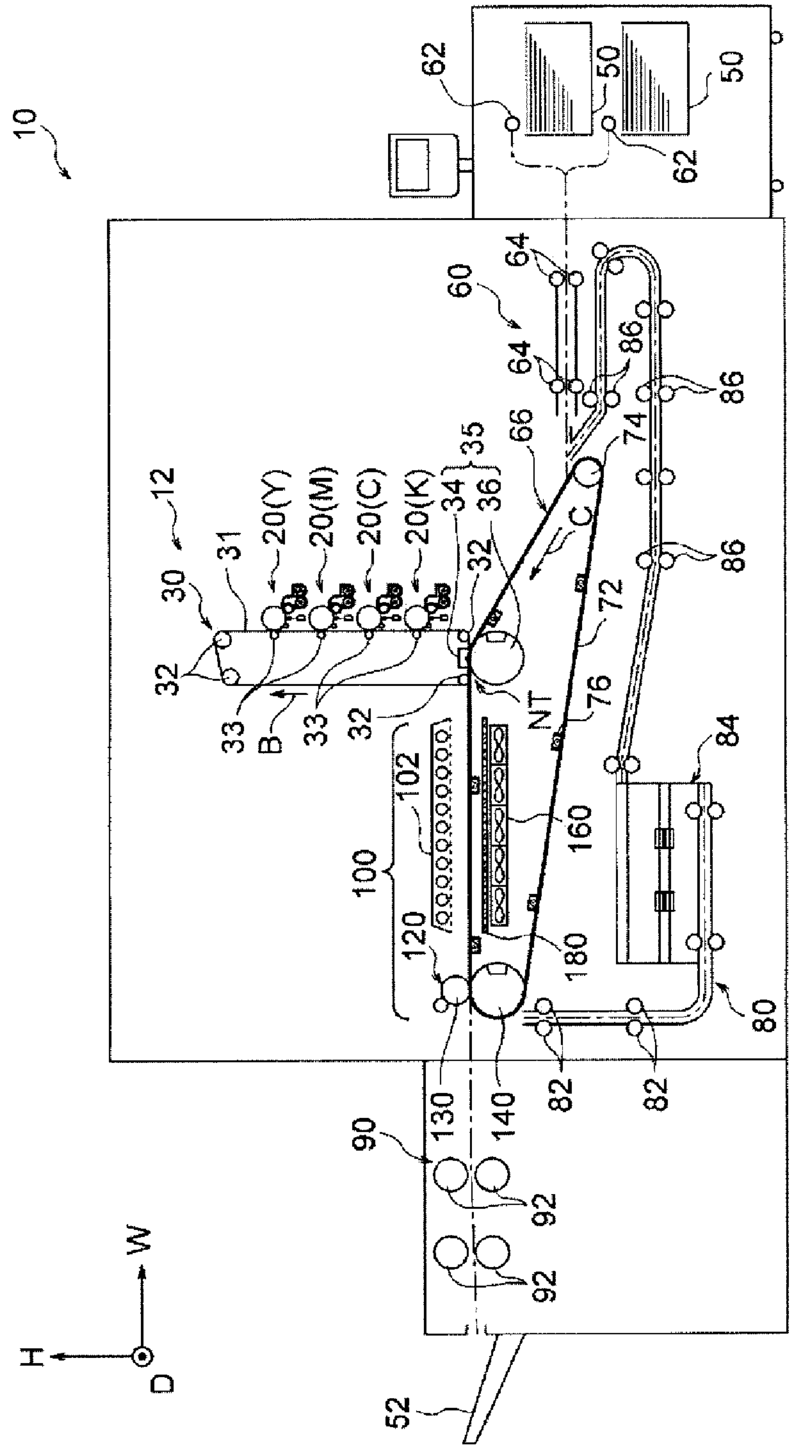
FIG. 1 is a schematic diagram showing the configuration of an image forming apparatus of an exemplary embodiment.

The configuration of an image forming apparatus 10 of the exemplary embodiment will be described. FIG. 1 is a schematic diagram showing the configuration of the image forming apparatus 10 of the exemplary embodiment.

The image forming apparatus 10 shown in FIG. 1 is an example of the image forming apparatus that forms an image on a recording medium. Specifically, the image forming apparatus 10 is an electrophotographic image forming apparatus that forms a toner image on a sheet P which is an example of the recording medium. As shown in FIG. 1, more specifically, the image forming apparatus 10 has sheet accommodating sections 50, a sheet discharging section 52, an image forming section 12, a feeding mechanism 60, a reversing mechanism 80, a fixing device 100, and a cooling section 90.

(Accommodating Section 50)

The accommodating sections 50 shown in FIG. 1 have a function of accommodating sheets P. The image forming apparatus 10 includes a plurality (for example, two) of accommodating sections 50, and is configured so as to feed a sheet P selectively from the plural accommodating sections 50. As the sheet P that is an example of the recording medium, a single sheet (cut sheet) having a predetermined size is used. The sheet P has the front surface PA (see FIG. 5) functioning as the one surface, and the rear surface PB (see FIG. 5) functioning as the other surface. The front surface PA of the sheet P has an image region GR (see FIG. 4) to which a toner image is to be transferred, i.e., the image region GR in which an unfixed image is to be formed.

(Sheet Discharging Section 52)

The sheet discharging section 52 shown in FIG. 1 is a portion onto which the sheet P on which an image is formed is discharged. Specifically, the apparatus is configured so that the sheet P to which an image is fixed by the fixing device 100, and which is then cooled by the cooling section 90 is discharged onto the sheet discharging section 52.

(Image Forming Section 12)

The image forming section 12 shown in FIG. 1 is an example of the image forming section that forms an image on the recording medium. Specifically, the image forming section 12 has a function of forming a toner image on the sheet P by using the electrophotographic method. As shown in FIG. 1, more specifically, the image forming section 12 has toner image forming portions 20 that form toner images, respectively, and a transferring device 30 that transfers the toner images formed by the toner image forming portions 20, to the sheet P.

[Toner Image Forming Portion 20]

Plural toner image forming portions 20 are provided so as to form toner images of respective colors. In the image forming apparatus 10, toner image forming portions 20 for a total of four colors of yellow (Y), magenta (M), cyan (C), and black (K) are provided. The characters (Y), (M). (C), and (K) shown in FIG. 1 indicate constituting portions corresponding to the colors, respectively.

Figure 2:
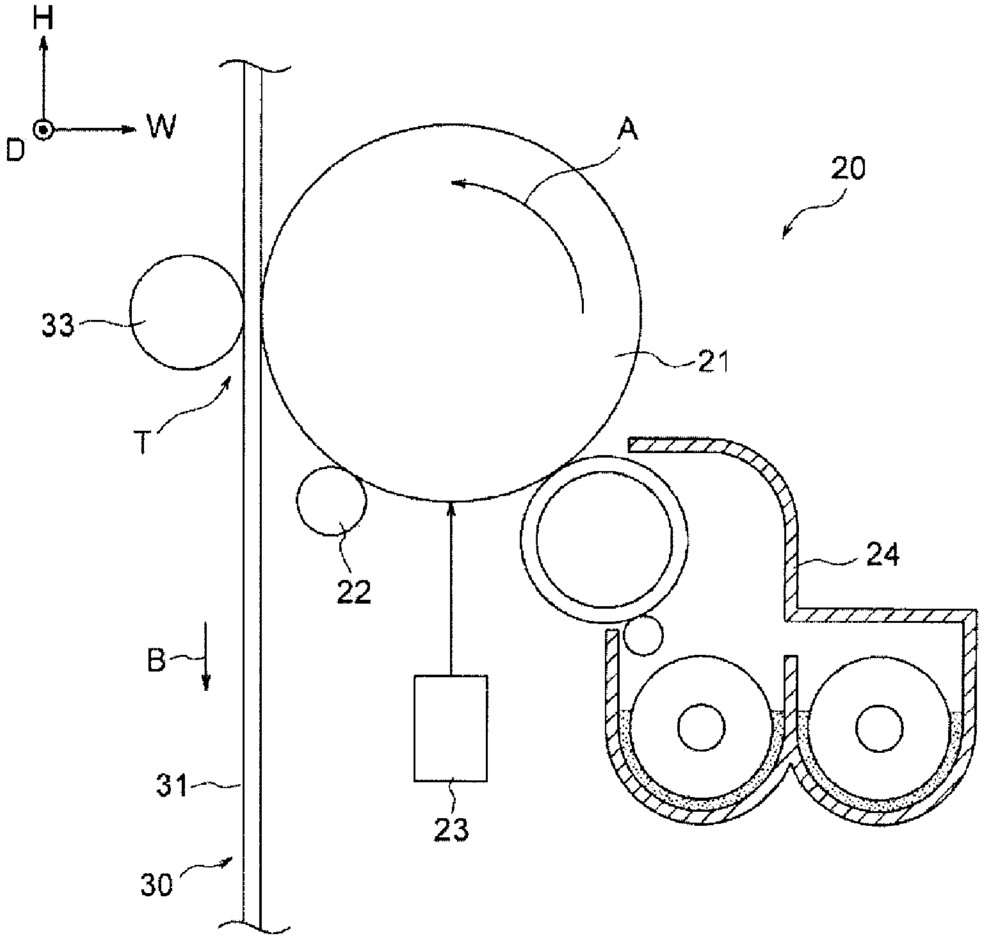
FIG. 2 is a schematic diagram showing the configuration of a toner image forming section in the exemplary embodiment.

The toner image forming portions 20 for the respective colors are configured in a basically similar manner except the used toner. As shown in FIG. 2, specifically, each of the toner image forming portions 20 for the respective colors has a photosensitive drum 21 (photosensitive member) that is rotated in the direction of the arrow A in FIG. 2, and a charging device 22 that charges the photosensitive drum 21. Each of the toner image forming portions 20 for the respective colors further has an exposing device 23 that exposes the photosensitive drum 21 which is charged by the charging device 22, thereby forming an electrostatic latent image on the photosensitive drum 21, and a developing device 24 that develops the electrostatic latent image which is formed on the photosensitive drum 21 by the exposing device 23, thereby forming a toner image.

[Transferring Device 30]

The transferring device 30 shown in FIG. 1 has a function of primarily transferring the toner images on the photosensitive drums 21 for the respective colors to an intermediate transfer member to be superimposed on one another, and secondarily transferring the superimposed toner images to the sheet P. As shown in FIG. 1, specifically, the transferring device 30 includes a transfer belt 31 functioning as an intermediate transfer member, primary transfer rollers 33, and a transferring section 35.

Each of the primary transfer rollers 33 has a function of transferring the toner image that is formed on the photosensitive drum 21 for the corresponding color, to the transfer belt 31 at a primary transfer position T (see FIG. 2) which is between the photosensitive drum 21 and the primary transfer roller 33.

As shown in FIG. 1, the transfer belt 31 has an endless shape, and is wound around plural rollers 32, whereby the attitude of the transfer belt is determined. The transfer belt 31 is caused to circulate in the direction of the arrow B, by rotationally driving at least one of the plural rollers 32, to feed the primarily transferred images to a secondary transfer position NT.

The transferring section 35 has a function of transferring the toner images which are transferred onto the transfer belt 31, to the sheet P. Specifically, the transferring section 35 has a secondary transferring portion 34 and an opposing roller 36.

The opposing roller 36 is placed below the transfer belt 31 so as to be opposed to the transfer belt 31. As shown in FIG. 1, the secondary transferring portion 34 is placed inside the transfer belt 31 so that the transfer belt 31 is placed between the secondary transferring portion and the opposing roller 36. Specifically, the secondary transferring portion 34 is configured by a corotron. In the transferring section 35, the toner images that are transferred to the transfer belt 31 are transferred to the sheet P which passes through the secondary transfer position NT, by an electrostatic force which is generated by the discharge of the secondary transferring portion 34.

(Feeding Mechanism 60)

The feeding mechanism 60 shown in FIG. 1 is a mechanism that feeds the sheet P. Specifically, the feeding mechanism 60 has a function of feeding the sheet P that is accommodated in one of the accommodating sections 50, to the secondary transfer position NT. The feeding mechanism 60 has a further function of feeding the sheet P from the secondary transfer position NT to a fixing unit 120 that will be described later (configured by a heating roller 130 and pressurizing roller 140 which will be described later). In other words, the feeding mechanism 60 has a function of, in the fixing device 100, feeding the sheet P to which toner images are transferred.

As shown in FIG. 1, specifically, the feeding mechanism 60 has feed out rollers 62, plural feeding rollers 64, and a chain gripper 66. The feed out rollers 62 are rollers for feeding out the sheet P that is accommodated in corresponding one of the accommodating sections 50. The plural feeding rollers 64 are rollers for feeding the sheet P that is fed out by one of the feed out rollers 62, to the chain gripper 66.

Figure 3:
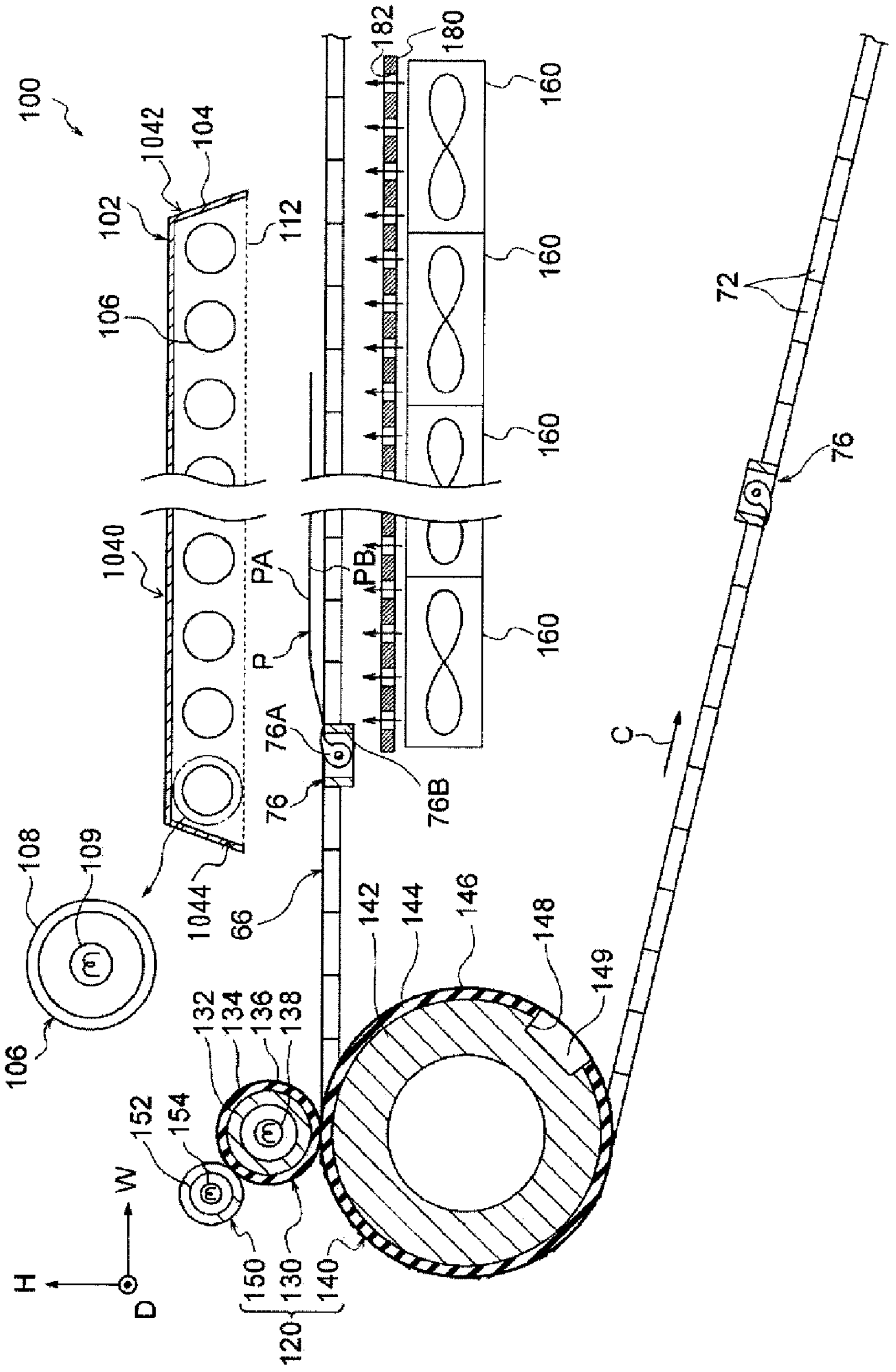
FIG. 3 is a schematic diagram showing the configuration of a fixing device of the exemplary embodiment.
Figure 4:
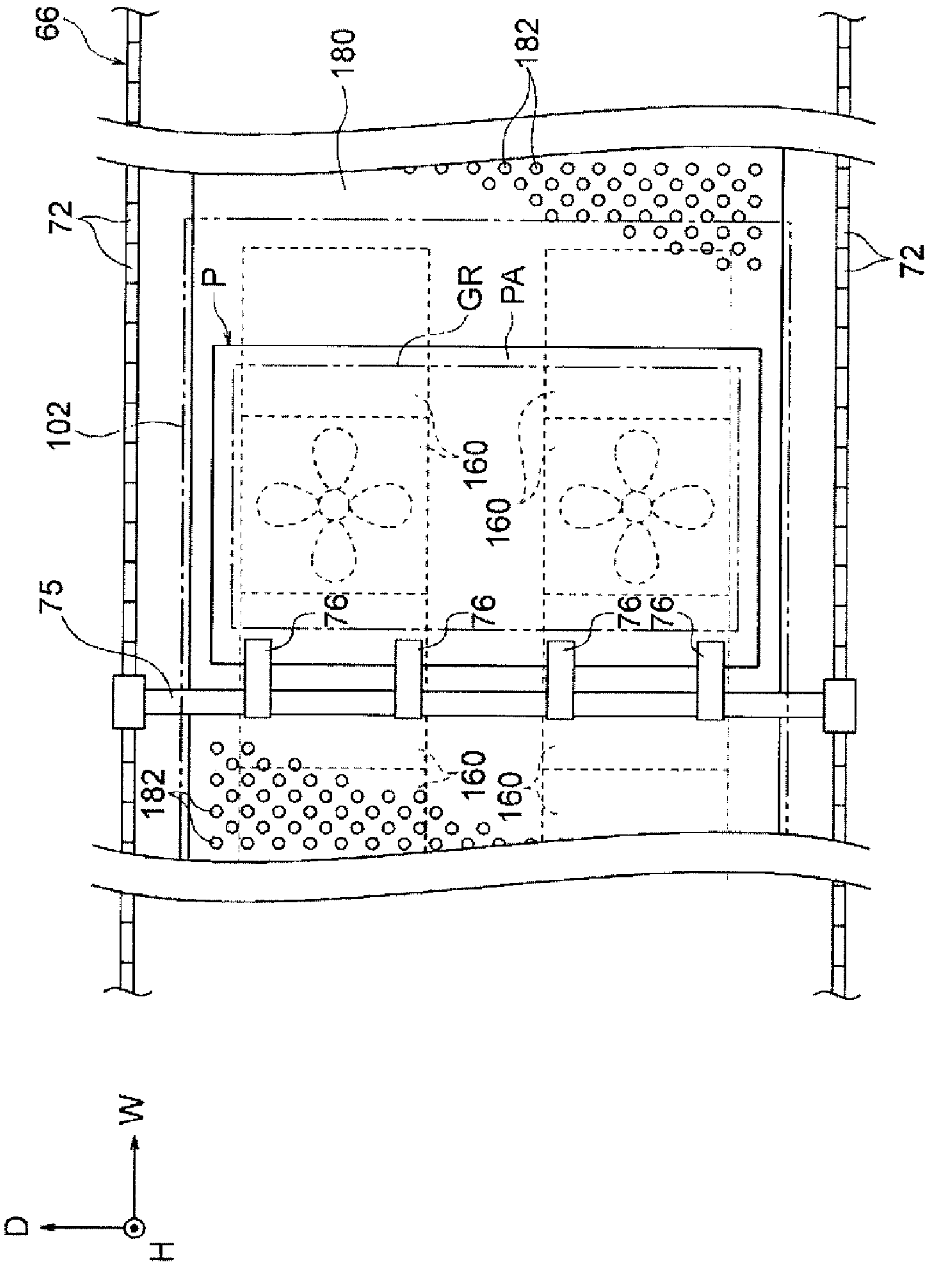
FIG. 4 is a plan view showing the configuration of the fixing device of the exemplary embodiment.

The chain gripper 66 is a feeding section that feeds the sheet P while holding the front-end side (tip-end side) of the sheet P as shown in FIGS. 3 and 4. Specifically, the chain gripper 66 includes a pair of chains 72, and grippers 76 that function as the holding member (gripping member).

As shown in FIG. 1, the pair of chains 72 are formed into an annular shape. The pair of chains 72 are placed at an interval in the anteroposterior direction (the direction D in FIG. 1) of the apparatus (see FIG. 4). The pair of chains 72 are wound respectively around a pair of sprockets (not shown) that are placed on one and other end sides in the axial direction of the opposing roller 36 and pressurizing roller 140 which will be described later, and a pair of sprockets 74 that are placed at an interval in the anteroposterior direction of the apparatus. When one of the pairs of sprockets is rotated, the chains 72 are circulated in the direction of the arrow C (see FIG. 1).

As shown in FIG. 4, attachment members 75 to which the grippers 76 are attached bridge between the pair of chains 72 in in the anteroposterior direction of the apparatus. Plural attachment members 75 are secured to the pair of chains 72 at predetermined intervals in the circumferential direction (circular direction) of the chains 72. In the figures, in order to illustrate the chains 72 in a simplified manner, portions constituting the chains 72 are shown in a rectangular shape.

Figure 5:
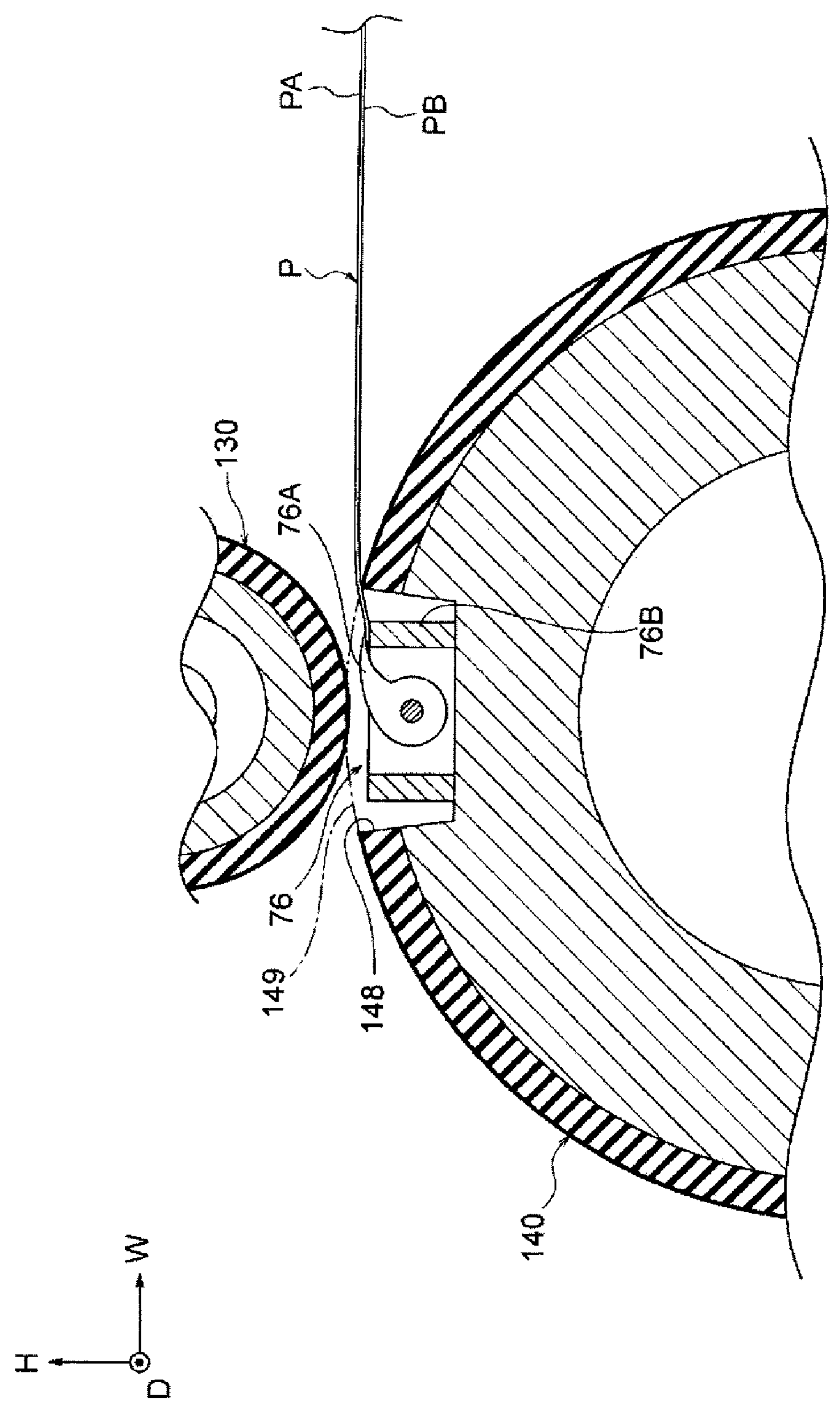
FIG. 5 is a schematic diagram enlargedly showing a part of a fixing unit in the exemplary embodiment.

As shown in FIG. 4, plural grippers 76 are attached to each of the attachment members 75, at predetermined intervals in the anteroposterior direction of the apparatus. The grippers 76 have a function of holding (gripping) a front-end portion of the sheet P. When the front-end portion of the sheet P is held, the position of the sheet P in the feeding direction of the sheet is easily determined, and the positioning (registration) between the sheet P and images in the transferring section 35 is facilitated. As shown in FIGS. 3 and 5, specifically, each of the grippers 76 has a claw 76A and a claw rest 76B. The gripper 76 is configured so that the front-end portion of the sheet P is clamped between the claw 76A and the claw rest 76B, whereby the sheet P is held. Specifically, the grippers 76 hold the front-end portion of the sheet P outside the image region GR (see FIG. 4) in the front surface PA to which the toner images are to be transferred. In each of the grippers 76, for example, the claw 76A is pressed against the claw rest 76B by a spring or the like, and opened or closed with respect to the claw rest 76B by the action of a cam or the like. Sometimes, marks that are called register marks are formed outside the image region GR in order to, when a printed matter is to be produced, indicate positions where an operation of cutting the printed matter into the finished dimensions is to be performed, or to perform registration for multicolor printing. In the case where the register marks are to be formed, the marks may be formed at positions where the grippers 76 overlap with the marks in the plan view shown in FIG. 4. The grippers 76 may be allowed to partly overlap with the image region GR, but the image is formed so as not to overlap with the grippers.

In the chain gripper 66, in the state where the grippers 76 hold the front-end portion of the sheet P, the chains 72 are circulated in the direction of the arrow C to feed the sheet P. The chain gripper 66 feeds the sheet P in the attitude in which the front surface PA is oriented upward, to the secondary transfer position NT, then causes the sheet P to pass through a heating section 102 that will be described later, and thereafter feeds the sheet to the fixing unit 120 that will be described later. As described above, the chain gripper 66 has a function of causing the sheet P to pass through the heating section 102, and feeding the sheet from the heating section 102 to the fixing unit 120, and functions also as the fixing device 100. In FIG. 1, a part of the feeding path along which the sheet P is fed in the feeding mechanism 60 is indicated by the dash-dot line.

(Reversing Mechanism 80)

The reversing mechanism 80 shown in FIG. 1 is an example of the reversing mechanism that reverses the front and rear surfaces of the recording medium on which an image is fixed by the fixing device. Specifically, the reversing mechanism 80 is a mechanism for reversing the sheet P to which the images are fixed by the fixing device 100. As shown in FIG. 1, more specifically, the reversing mechanism 80 has a plurality (for example, two) of feeding rollers 82, a reversing device 84, and a plurality (for example, seven) of feeding rollers 86.

The plural feeding rollers 82 feed the sheet P that is sent from the fixing device 100, to the reversing device 84.

In the reversing device 84, for example, the sheet P is twisted like a Mobius strip by feeding the sheet P while being folded plural times so that the feeding direction of the sheet P is changed by an increment of, for example, 90 degrees, whereby the sheet P are reversed.

The plural feeding rollers 86 feed the sheet P in which the front and rear surfaces are reversed by the reversing device 84, to the chain gripper 66. Namely, the plural feeding rollers 86 have a function of delivering the sheet P in which the front and rear surfaces are reversed, to the chain gripper 66.

When, as described above, the reversing mechanism 80 reverses the sheet P, and delivers the sheet to the chain gripper 66, the chain gripper 66 feeds the delivered sheet Pas the sheet P in which the toner images are fixed to the rear surface PB.

In FIG. 1, a part of the feeding path along which the sheet P is fed in the reversing mechanism 80 is indicated by the dash-dot line. Alternatively, the reversing mechanism 80 may be a mechanism in which the sheet P is reversed by switch backing the sheet.

(Fixing Device 100)

The fixing device 100 shown in FIG. 3 is an example of the fixing device that fixes an image which is formed by the image forming section, to the recording medium. Specifically, the fixing device 100 is a device that fixes the toner images which are transferred by the transferring device 30, to the sheet P.

As shown in FIG. 1, the fixing device 100 is placed downstream of the secondary transfer position NT in the feeding direction of the sheet P. As shown in FIG. 3, the fixing device 100 has the heating section 102, the chain gripper 66 that is described above, air blowers 160, a ventilation plate 180, and the fixing unit 120 (fixing section).

[Heating Section 102]

The heating section 102 shown in FIG. 3 is an example of the heating section that heats in a non-contact manner the front surface of the recording medium. Specifically, the heating section 102 has a function of heating in a non-contact manner the front surface PA of the sheet P that is fed by the chain gripper 66.

The heating section 102 is placed downstream of the secondary transfer position NT (see FIG. 1) in the feeding direction of the sheet P, so as to be opposed to the front surface PA of the sheet P that is fed by the chain gripper 66. Specifically, the heating section 102 includes a reflection plate 104, plural heaters 106 (heating source), and a wire mesh 112.

[Reflection Plate 104]

The reflection plate 104 has a function of reflecting infrared beams emitted from the heaters 106, toward the lower side of the apparatus (the side of the sheet P that is fed by the chain gripper 66). The reflection plate 104 is formed by using, for example, a metal plate such as an aluminum plate. The reflection plate 104 is formed into a box-like shape in which the lower side of the device is opened. Specifically, the reflector 104 includes: an upper reflector 1040 that covers the upper side of the heater 106 of the heating section 102; an upstream side reflector 1042 extending downward from the upper reflector 1040 and covering the upstream side surface of the heater 106 on the upstream side of the reflector 104 in the feeding direction of the sheet P; an downstream side reflector 1044 extending downward from the upper reflector 1040 and covering the downstream side surface of the heater 106; and a pair of side reflectors extending downward from the upper reflector 1040 at both side ends of the reflector 104 in a direction intersecting the transport direction of the sheet P and covering both side surfaces of the heater 106.

[Heater 106]

The heaters 106 are infrared heaters having a columnar shape that is elongated in the anteroposterior direction of the apparatus. A plurality (for example, 40) of heaters 106 are arranged inside the reflection plate 104 in the width direction of the apparatus. Specifically, each of the heaters 106 includes a carbon filament 109, and a cylindrical quartz tube 108 in which the carbon filament 109 is accommodated. A black infrared radiation film is formed on the front surface of the quartz tube 108. Since the black infrared radiation film is formed on the front surface of the quartz tube 108 in this way, the heater 106 may efficiently radiate infrared beams as compared with the case where, for example, a white film is formed. In the exemplary embodiment, black is a color in which, when the deviation in chromaticity from an achromatic point (x=0.333, y=0.333, Y=0) is indicated by the color difference ΔE, the color difference ΔE is equal to or smaller than 100. In FIG. 3, in order to specifically illustrate the configuration of each of the heaters 106, the heater 106 is enlargedly shown in the upper left side of the heating section 102. In the heaters 106 in the exemplary embodiment, the peak of the radiation wavelength of the infrared beams is set to be equal to or larger than 2 [μm] and equal to or smaller than 5 [μm], or in the so-called far-infrared region. The surface temperature of the heaters 106 of the heating section 102 is set to a predetermined temperature which is equal to or higher than 300 [° C.] and equal to or lower than 1,175 [° C.]. In the exemplary embodiment, moreover, the heaters 106 which efficiently radiate far-infrared beams are arranged in the width direction of the apparatus at a density of or more and 100 or less per 1 [m] of the length of the reflection plate 104 in the width direction of the apparatus, and therefore an excellent heating distribution is obtained.

The case will be considered where a recording medium that has an A2 or larger size or a large width is fed in a manner that the long side of the recording medium extends in the feeding direction of the recording medium, and a toner on the recording medium is heated. When the heating operation is performed by the far-infrared heaters 106 which are arranged at a density less than 20 per meter, the voltage that is to be applied to the carbon filaments is raised in order to increase the output of each of the heaters 106. When the voltage is raised, however, the temperature of the black infrared radiation film is raised, and the fusion of the toner is dominantly caused by heat conduction from the surrounding air that is heated by the near-infrared component rather than the far-infrared component. As a result, uneven fusion occurs between the vicinity of the heaters 106 and the heaters 106. When the density is set to be 20 or greater per meter, by contrast, far-infrared radiation from the carbon filaments may be made dominant, and therefore far-infrared beams that show a weak dependence on distance from the radiation source may be efficiently used in fusion of the toner as compared with the case where the density is less that 20 per meter, so that fusion unevenness among the heaters 106 is reduced. When the number of the heaters is larger than 100, far-infrared beams are excessively radiated, and therefore it is difficult to control the temperature of the irradiated member to a degree at which the toner fuses. Furthermore, the fixing device that is in the subsequent stage is heated by the heat of the toner, and the temperature control becomes difficult. Therefore, the number of the heaters may be 100 or less. In the case where a recording medium having a B2 or larger size is fed in a manner that the long side of the recording medium extends in the feeding direction of the recording medium, particularly, the number of the heaters may be 30 or more and 50 or less.

[Wire Mesh 112]

The wire mesh 112 is secured to the edge portion of the lower opening of the reflection plate 104. According to the configuration, the interior and exterior of the reflection plate 104 are separated from each other by the wire mesh 112. The wire mesh 112 prevents the sheet P that is fed by the chain gripper 66, from being in contact with the heaters 106.

[Chain Gripper 66]

The chain gripper 66 shown in FIG. 3 is an example of the feeding section that feeds the recording medium while the front surface of the recording medium is opposed to the heating section. The grippers 76 provided in the chain gripper 66 are an example of the holding section that holds at least the front-end side of the recording medium. The front-end side of the recording medium means a portion of the recording medium which is downstream (on the front side) of the middle in the feeding direction.

In the chain gripper 66, specifically, the chains 72 are circulated in the direction of the arrow C as described above in the state where the chain gripper 66 holds the front-end portion of the sheet P, thereby feeding the sheet P while the front surface PA of the sheet P is opposed to the heaters 106 of the heating section 102. Namely, the chain gripper 66 has a function of causing the sheet P to pass through the heating region of the heating section 102. In the feeding by the chain gripper 66, the rear-end side of the sheet P is not held and is in a free state.

The chain gripper 66 has a further function of feeding the sheet P from the heating section 102 to the fixing unit 120. In the portion having the function of causing the sheet P to pass through the heating region of the heating section 102, and that of feeding the sheet from the heating section 102 to the fixing unit 120, as described above, the chain gripper 66 functions as an example of the feeding section of the fixing device 100.

[Air Blower 160]

The air blowers 160 shown in FIG. 3 are an example of the maintaining section that, in order to enable the recording medium to be fed by the feeding section in a state where the rear surface that is opposite to the front surface, and that is in an image region where an unfixed-image is formed on the front surface is in a non-contact state, maintains the non-contact state. The air blowers 160 are also an example of the air blowing section that blows air to the rear surface of the recording medium that is fed by the feeding section. Alternatively, a configuration that functions both as the feeding section and the air blowing section may be employed, and the sheet P may be fed while the non-contact state is maintained by using only the air blowing section.

Plural air blowers 160 are placed inside (on the inner circumferential side) of the chains 72 as seen in the anteroposterior direction of the apparatus, and below the heating section 102. As shown in FIGS. 3 and 4, the plural air blowers 160 are placed in a two-dimensional pattern (matrix-like pattern) along the direction of feeding the sheet P and the anteroposterior direction of the apparatus. In order to simplify the illustration of the air blowers 160, the blades of a part of the air blowers 160 are not shown in FIG. 4.

As shown in FIG. 3, the air blowers 160 are upward directed, and configured so as to blow air to the upper side. Namely, the air blowers are configured so as to blow air in the thickness direction of the sheet P to only the rear surface PB of the sheet P that is in the state where the rear surface is opposed to the heating section 102. In other words, the air blowers 160 are placed so as to be opposed to the rear surface PB of the sheet P that is fed by the chain gripper 66. In other words, furthermore, the chain gripper 66 is configured so as to feed the sheet P while causing the rear surface PB of the sheet P to be opposed to the air blowers 160.

For example, axial flow air blowers that blow air in the axial direction are used as the air blowers 160. Alternatively, centrifugal air blowers that blow air in the centrifugal direction, such as multi-blade air blowers (for example, sirocco fans) may be used as the air blowers 160.

When the air blowers 160 blow air to the rear surface PB of the sheet P that is fed by the chain gripper 66, the sheet P rises from the ventilation plate 180. This causes the rear surface PB of the sheet P to be in the non-contact state. Specifically, at least the rear surface PB in the image region GR of the sheet P is set to the non-contact state. More specifically, at least the rear surface PB in the image region GR of the sheet P is set to the non-contact state with respect to the ventilation plate 180. Therefore, the air blowers 160 have a function of maintaining the non-contact state so that the sheet P is fed by the chain gripper 66 in the state where the rear surface PB in the image region GR of the sheet P is in the non-contact state. The rear surface PB outside the image region GR of the sheet P is allowed to be in contact with the ventilation plate 180. It is necessary to prevent the air which is blown from blow-out ports of the air blowers 160, from being supplied directly to the front surface PA of the sheet P. This is because the image forming apparatus 10 of the exemplary embodiment is an image forming apparatus of the type in which an image is formed by using dry toner, and, when air is supplied directly to the front surface of the sheet P from the blow-out ports, unfixed toner images may be disturbed. When air is supplied only to the rear surface PB, moreover, the toner which is transferred to the front surface PA is prevented from being cooled.

[Ventilation Plate 180]

The ventilation plate 180 shown in FIG. 3 is an example of the ventilating section having plural ventilation holes through which the air that is blown from the air blowing section toward the rear surface of the recording medium may pass. Specifically, the ventilation plate 180 is configured by a plate in which plural ventilation holes 182 through which the air that is blown from the air blowers 160 toward the rear surface PB of the sheet P may pass are formed.

The ventilation plate 180 is placed inside (on the inner circumferential side) of the chains 72 as seen in the anteroposterior direction of the apparatus, below the heating section 102, and above the air blowers 160 so that the thickness direction coincides with the vertical direction of the apparatus. Namely, the ventilation plate is placed so as to cover the air blowers 160 on the side of the blowing direction of the air blowers 160. In other words, it may be said also that the ventilation plate 180 is an example of the placement member that is placed so as to be opposed to the rear surface PB of the sheet P which is fed by the chain gripper 66.

The ventilation holes 182 pass through the ventilation plate 180 in the thickness direction. As shown in FIG. 4, the plural ventilation holes 182 are placed in a two-dimensional pattern (matrix-like pattern) along the direction of feeding the sheet P and the anteroposterior direction of the apparatus. In order to simplify the illustration of the ventilation plate 180, a part of the ventilation holes 182 is not shown in FIG. 4.

The ventilation plate 180 is configured so that air that is blown from the air blowers 160 is caused to pass through the plural ventilation holes 182 to hit against the rear surface PB of the sheet P which is fed by the chain gripper 66. In other words, a configuration is employed where the air blowers 160 blow air to the rear surface PB of the sheet P that is fed by the chain gripper 66, through the ventilation plate 180 in which the plural ventilation holes 182 are formed.

The ventilation plate 180 is configured by a metal plate. The ventilation plate 180 functions also as a reflection plate that reflects the infrared beams emitted from the heaters 106, toward the upper side of the apparatus (the side of the sheet P that is fed by the chain gripper 66).

In the exemplary embodiment, in a configuration where the length of each of the heaters 106 in the width direction of the apparatus is set to 1 [m], a recording medium to be fed may be used in which the length in the width direction of the apparatus is equal to or larger than the length of the A2 size. When a recording medium which is smaller than the A2 size is used, the area where the air blown by the air blowers 160 is blocked by the recording medium is so small that most of the air is supplied to the infrared heaters 106, with the result that there is a possibility that the heated air in the periphery of the heating section 102 may be diffused in the apparatus. When a recording medium having an A2 or larger size is fed, the recording medium occupies about 50 or more percent of the length of the infrared heaters 106 in the width direction of the apparatus, and therefore the temperature rise in the apparatus may be suppressed.

In the exemplary embodiment, the blowing region that is set by the air blowers 160 and the ventilation plate 180 is set to be longer upstream in the feeding direction of the sheet P than the heating region that is set by the above-described heating section 102. Before the sheet P that has passed through the transferring section 35 enters the heating section 102, namely, the rear surface PB is air blown by the air blowers 160. This causes the sheet P to be carried to the heating section 102 in the state where the attitude of the sheet is stabilized. The blowing region may be set while a point that is immediately behind the transferring section 35, and that does not overlap with the transfer belt 31 in the gravitational direction is used as the starting point, and the region is directed downstream in the feeding direction of the sheet P. The blowing region set by the air blowers 160 and the ventilation plate 180 is set to be longer upstream in the feeding direction of the sheet P than the upstream reflector 1042 located on the upstream side in the feeding direction of the sheet P in the reflector 104. That is, the sheet P after passing through the transferring section 35 is air blown by the air blowers 160 on the rear surface PB before the upstream side reflector 1042 that partitions the heating region set by the heating section 102. Another point of view may be said that the contact position between the transfer belt 31 which is the transfer unit 35 and the paper P, the upstream end of the blowing region, and the upstream end of the heating region by the heating unit 102 are arranged in this order toward the downstream in the feeding direction of the sheet P.

The relative positional relationship between the heating region and the blowing region on the downstream side of the heating section 102 may be set in a manner that the heating region is closer to the fixing unit 120 that will be described later, more specifically, a contact position between the heating roller 130 and the pressurizing roller 140 in the fixing unit 120, than the blowing region. Namely, the sheet P which is being fed has a portion which is heated by the heating section 102 until just before the sheet enters the fixing unit 120, but the rear surface PB of which is not subjected to the air blowing of the air blowers 160. More specifically, the position of the downstream reflector 1044 on the reflector 104 is set longer toward the downstream in the feeding direction of the sheet P than the blowing region. The position of the downstream end of the heater 106 as the heating source constituting the heating section 102 in the feeding direction of the sheet P may be set longer toward downstream of the blowing region formed by the blowers 160 in the feeding direction of the sheet P. Another viewpoint may be said that the downstream end of the blowing region, the downstream end of the heater 106, and the contact position between the heating roller 130 and the pressure roller 140 in the fixing unit 120 are arranged in this order toward the downstream side in the feeding direction of the sheet P. This is because, when the blowing region is set up to a position that is close to the fixing unit 120, there is a possibility that the air blowing may exert an influence on the sheet P which enters the fixing unit 120, for example, that the attitude of the sheet P that enters the fixing unit may be disturbed.

[Fixing Unit 120]

The fixing unit 120 shown in FIG. 3 is a fixing section that fixes an image on the sheet P to the sheet P. Specifically, the fixing unit 120 has a function of contacting with the sheet P to heat and pressurize the sheet P, thereby fixing the toner images to the sheet P. Although the exemplary embodiment having the heating section 102 that performs heating and pressurization will be described, heating is not always necessary. In the case where the object of the process is to improve the surface property of the toner which is fused by the heating section 102 in the previous step, such as the adjustment of the gloss, even a mode where only the pressurization is performed by a pressurizing section may be employed in the invention.

As shown in FIG. 3, the fixing unit 120 is placed downstream of the heating section 102 in the feeding direction of the sheet P. Specifically, the fixing unit 120 has the heating roller 130, the pressurizing roller 140, and a driven roller 150.

[Heating Roller 130]

The heating roller 130 shown in FIG. 3 is an example of the heating member that is placed downstream of the heating section in the feeding direction, and that heats the recording medium. Specifically, the heating roller 130 is placed downstream of the heating section 102 in the feeding direction, and has a function of contacting with the sheet P to heat the sheet P. The heating roller 130 is placed while making the anteroposterior direction of the apparatus coincident with the axial direction so that the heating roller is in contact with the front surface PA of the sheet P.

The heating roller 130 has: a cylindrical base member 132; a rubber layer 134 that is formed on the outer circumference of the base member 132; a release layer 136 that is formed on the outer circumference of the rubber layer 134; and a heater 138 (heating source) that is accommodated in the base member 132. The heater 138 is configured by, for example, a single or plural halogen lamps.

Figure 6:
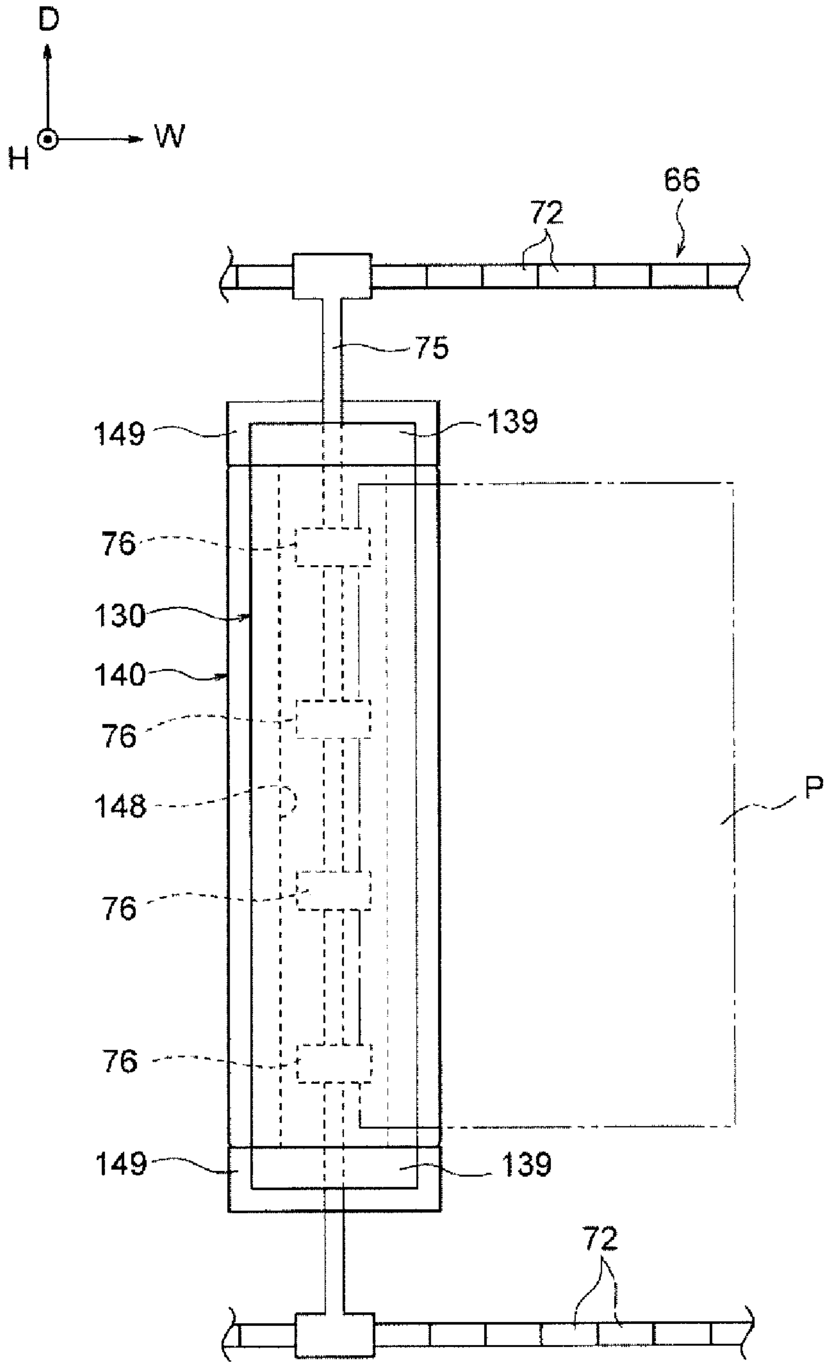
FIG. 6 is a plan view showing the fixing unit in the exemplary embodiment.

In the heating roller 130, as shown in FIG. 6, butted portions 139 that are butted against butting portions 149 that will be described later, and that are disposed in the pressurizing roller 140 are disposed. The butted portions 139 are an example of a butted portion that is disposed in the heating roll. Specifically, each of the butted portions 139 is formed into a cylindrical shape having an outer diameter that is equivalent to that of the heating roller 130. Moreover, the butted portions 139 are disposed respectively in one and other end portions in the axial direction of the heating roller 130 so that the butted portions are coaxial with the heating roller 130, and rotated integrally with the heating roller 130.

[Driven Roller 150]

The driven roller 150 shown in FIG. 3 is placed while making the anteroposterior direction of the apparatus coincident with the axial direction so that the driven roller is in contact with a region of the outer circumferential surface of the heating roller 130 that is other than the region with which the sheet P is contacted. The driven roller 150 has a cylindrical base member 152, and a heater 154 (heating source) that is accommodated in the base member 152. The driven roller 150 is drivenly rotated by the heating roller 130, and heats the heating roller 130. Since the heating roller 130 is heated by the driven roller 150, and the heating roller 130 itself has the heater 138, the surface temperature of the heating roller 130 is a predetermined temperature of 180 [° C.] or higher and 200 [° C.] or lower.

[Pressurizing Roller 140]

The pressurizing roller 140 shown in FIG. 3 is an example of the pressurizing member that cooperates with the heating roller to pressurize the recording medium, and that has a recess into which the holding section enters is formed in the outer circumferential surface. Specifically, the pressurizing roller 140 has a function of cooperating with the heating roller 130 to clamp the sheet P, and pressuring the sheet. The pressurizing roller 140 is placed below the heating roller 130 while making the anteroposterior direction of the apparatus coincident with the axial direction.

The pressurizing roller 140 has: a cylindrical base member 142; a rubber layer 144 that is formed on the outer circumference of the base member 142; and a release layer 146 that is formed on the outer circumference of the rubber layer 144.

The circumferential length of the pressurizing roller 140 is made equal to the placement interval at which the grippers 76 are arranged on the chains 72. As shown in FIGS. and 6, the recess 148 that extends in the anteroposterior direction of the apparatus is formed in the outer circumferential surface of the pressurizing roller 140.

The pressurizing roller 140 is configured so that, when the grippers 76 that hold the front-end side of the sheet P passes between the pressurizing roller 140 and the heating roller 130, the grippers 76 enter the recess 148.

In the pressurizing roller 140, as shown in FIG. 6, the butting portions 149 that butt respectively against the butted portions 139 of the heating roller 130 are disposed. The butting portions 149 are an example of the butting portions that are disposed axially outside the recess of the pressurizing roll, and that butt respectively against the butted portions 139 to maintain the axis-to-axis distance between the heating roller 130 and the pressurizing roller 140.

The butting portions 149 are formed into a cylindrical shape having an outer diameter that is equivalent to that of the pressurizing roller 140. The butting portions 149 are placed axially outside the recess 148 of the pressurizing roller 140. Specifically, the butting portions 149 are disposed respectively in one and other end portions in the axial direction of the pressurizing roller 140 so that the butting portions are coaxial with the pressurizing roller 140, and rotated integrally with the pressurizing roller 140.

Even when the case where the heating roller 130 and the pressurizing roller 140 are rotated in the state where the butting portions 149 butt against the butted portions 139, and, as a result, the recess 148 is opposed to the heating roller 130, the axis-to-axis distance between the heating roller 130 and the pressurizing roller 140 is maintained. Consequently, the surface pressure of the load at which the pressurizing roller 140 is urged toward the heating roller 130 by an urging member that is not shown is about 250 [kPa] or lower and 108 [kPa] or higher. In the related art, the surface pressure in a usual fixing device is about 400 [kPa].

In the fixing unit 120, the pressurizing roller 140 is rotated by a driving section (not shown), the heating roller 130 is drivenly rotated by the pressurizing roller 140, and the driven roller 150 is drivenly rotated by the heating roller 130.

(Cooling Section 90)

As shown in FIG. 1, the cooling section 90 is placed downstream of the fixing unit 120 in the feeding direction of the sheet P. The cooling section 90 includes a plurality (for example, two) of cooling rollers 92 that are juxtaposed in the width direction of the apparatus.

Each of the cooling rollers 92 is configured by a cylindrical roller that is made of a metal or the like. The cooling roller 92 has a configuration where air flows through the interior of the roll, and the sheet P is cooled by the air (heat exchange with the air).

(Functions of Exemplary Embodiment)

The sheet P that is sent out from one of the accommodating sections 50 shown in FIG. 1 is fed by the plural feeding rollers 64, and delivered to the chain gripper 66. The sheet P that is delivered to the chain gripper 66 is fed to the secondary transfer position NT by the chain gripper 66 in the state where the front-end portion is held by the grippers 76, and the toner images are transferred from the transfer belt 31 to the front surface PA. As shown in FIG. 3, the sheet P to which the toner images are transferred is fed by the chain gripper 66 to the heaters 106 of the heating section 102 in the state where the front surface PA is opposed to the heaters 106, and the toner images are heated. In the exemplary embodiment, the movement speed of the chain gripper 66 is 700 [mm/sec] or lower and 520 [mm/sec] or higher.

The sheet P in which the toner images are heated by the heating section 102 is further fed to the fixing unit 120 by the chain gripper 66, and pressurized and heated while being clamped between the heating roller 130 and the pressurizing roller 140. This causes the toner images to be fixed to the sheet P. In the case where an image is to be formed on only the front surface PA of the sheet P, the sheet P to which the toner images are fixed is cooled by the cooling rollers 92 of the cooling section 90 shown in FIG. 1, and then discharged onto the sheet discharging section 52.

In the configuration, the relative positions of the fixing unit 120 and the heating section 102 are determined so that the time period when the sheet P that is fed by the chain gripper 66 is moved from the downstream end of the heating section 102 to a nipping section N is 0.3 [sec] or shorter and 0.1 [sec] or longer. Specifically, the relative positions of the fixing unit 120 and the heating section 102 are determined so that the time period from the passage of the front end of the sheet P through the end portion of the heating section 102 on the side of the fixing unit 120, to the arrival of the front end of the sheet P to the nipping section N is 0.3 [sec] or shorter and 0.1 [sec] or longer.

In another view, the relative distance between the downstream end of the heating section 102 and the nipping section N of the heating section 102 is set to be shorter than the feeding direction length of the sheet P that is used in the image forming apparatus. Therefore, the attitude in which the rear-end side of the sheet P is stabilized is maintained until the sheet P arrives at the nipping section N.

The feeding speed of the sheet P is determined so that the time period when the sheet P to which the toner images are transferred is heated in the nipping section Nis 30 [msec] or shorter and 10 [msec] or longer. Specifically, the feeding speed of the sheet P is determined so that the time period from the arrival of a predetermined reference point on the sheet P to the nipping section N, to the passage of the reference point through the nipping section Nis 30 [msec] or shorter and 10 [msec] or longer.

In the case where images are to be formed on the both surfaces of the sheet P, the sheet P in which an image is fixed to the front surface PA is reversed by the reversing mechanism 80 shown in FIG. 1, and then again delivered to the chain gripper 66. The sheet P that is delivered to the chain gripper 66 is fed to the secondary transfer position NT as the sheet P in which the fixed toner images are formed on the rear surface PB, and toner images are transferred from the transfer belt 31 to the front surface PA.

In a manner similar to that described above, the sheet P to which the toner images are transferred is heated in the heating section 102, and then pressurized and heated while being clamped between the heating roller 130 and the pressurizing roller 140, whereby the toner images are fixed to the sheet P. The sheet P to which the toner images are fixed is cooled by the cooling rollers 92 of the cooling section 90, and then discharged onto the sheet discharging section 52.

In the exemplary embodiment, as shown in FIG. 3, the air blowers 160 blow air to the rear surface PB of the sheet P that is fed by the chain gripper 66, in the heating section 102, and therefore the air blowers 160 maintain the non-contact state of the rear surface PB in the image region GR of the sheet P so that the sheet P is fed in the non-contact state.

Here, a configuration (first configuration) where, when the sheet P is fed while the front surface PA is opposed to the heating section 102, the rear surface PB in the image region GR of the sheet P is in contact with a portion constituting the apparatus is considered. In the first configuration, in the case where the operation of the fixing device 100 is continued, and therefore the constituting portion (for example, the ventilation plate 180) with which the sheet P is in contact is heated by the heating section 102, the sheet P is heated by the constituting portion, and the fusion of the toner is advanced.

Therefore, the fusibility of the toner in the initial stage of the operation of the fixing device 100 is varied from that in the stage where the operation of the fixing device 100 is continued. Therefore, the heating temperatures of the heating section 102 and the heating roller 130 is changed between the initial stage of the operation of the fixing device 100 and the stage where the operation of the fixing device 100 is continued. As a result, the control of the heating temperature is complicated.

In the exemplary embodiment, by contrast, the air blowers 160 maintains the non-contact state of the rear surface PB in the image region GR of the sheet P so that the sheet P is fed in the non-contact state. As compared with the above-described first configuration, therefore, the rear surface PB of the sheet P is not heated, and the influence caused by the heat (for example, conductive heat) that is received from the rear surface PB of the sheet P is reduced. In other words, the temperature control of the heating performed by the heating section 102 and the heating roller 130 is prevented from becoming complicated.

In the case where images are to be formed on the both surfaces of the sheet P, even when the sheet P in which the fixed toner images are formed on the rear surface PB is fed in the heating section 102 by the chain gripper 66, particularly, the rear surface PB of the sheet P is not heated, and, as compared with the first configuration, the fixed toner images are prevented from being fused. In order to, in the case where images are to be formed on the both surfaces of the sheet P, prevent the fixed toner images from being fused, particularly, the feeding section and the air blowing section are controlled so that, when the sheet Pin which the fixed toner images are formed on the rear surface PB passes through the heating section 102, the rear surface PB is in the non-contact state. In the case where the sheet P in which fixed toner images are not formed on the rear surface PB, and unfixed toner images are formed only on the front surface PA, the feeding operation may be performed while the ventilation plate 180 and the like are always contacted with the rear surface PB.

In the exemplary embodiment, in the heating section 102, the air blowers 160 blow air to the rear surface PB of the sheet P that is fed by the chain gripper 66, through the ventilation plate 180 in which the plural ventilation holes 182 are formed. Therefore, the air is prevented from unevenly hitting the rear surface PB of the sheet P, as compared with a configuration (second configuration) where air blown from the air blowers 160 directly hits the rear surface PB of the sheet P without passing through the ventilation holes 182. Consequently, the attitude of the sheet P is hardly varied as compared with the above-described second configuration.

In the exemplary embodiment, in the case where the grippers 76 that hold the front-end side of the sheet P pass between the pressurizing roller 140 and the heating roller 130, as shown in FIG. 5, the grippers 76 enter the recess 148. Therefore, the grippers 76 hardly hinder the pressurization of the sheet P as compared with a configuration where the sheet P is pressurized between the pressurizing roller 140 in which the recess 148 is not formed, and the heating roller 130.

In the exemplary embodiment, even when the state where the recess 148 is opposed to the heating roller 130 is formed by rotating the heating roller 130 and the pressurizing roller 140 in the state where the butting portions 149 shown in FIG. 6 are butted against the butted portions 139, the axis-to-axis distance between the heating roller 130 and the pressurizing roller 140 is maintained. Therefore, the pressure that pressurizes the sheet P may be prevented from varying, as compared with a configuration where the sheet P is pressurized between the pressurizing roller 140 and heating roller 130 the axis-to-axis distance between which is not maintained.

In the exemplary embodiment, when the sheet P is fed while the front surface PA is opposed to the heating section 102, the attitude of the sheet P may be changed. Namely, the sheet P may be fed in the state where the rear-end side of the sheet P hangs down. The heating section 102 heats the sheet P by using infrared electromagnetic waves. Even when the attitude of the sheet P is changed, therefore, the sheet P is heated.

Furthermore, for example, a configuration may be employed where the rear surface PB in the image region GR of the sheet P is temporarily contacted with the ventilation plate 180. In the exemplary embodiment, even in the case where the rear surface PB in the image region GR of the sheet P is temporarily contacted with the ventilation plate 180, the configuration where the air blowers 160 blow air to the rear surface PB of the sheet P fed by the chain gripper 66 performs the following functions.

According to the configuration, in the heating section 102, the air blowers 160 blow air to the rear surface PB of the sheet P fed by the chain gripper 66, and therefore the sheet P rises. When the sheet P is fed while the front surface PA is opposed to the heating section 102, therefore, the rear surface PB of the sheet P is hardly contacted with the ventilation plate 180 as compared with a configuration (third configuration) where a calm state in which air is not blown against the rear surface PB of the sheet P is set. Consequently, the rear surface PB of the sheet P is hardly heated as compared with the above-described third configuration, and the influence caused by the heat that is received from the rear surface PB of the sheet P is reduced.

In the exemplary embodiment, a configuration where the air blowers 160 and the ventilation plate 180 are not disposed may be employed. This configuration performs the following functions in the configuration where the grippers 76 of the chain gripper 66 hold the front-end side of the sheet P.

According to the configuration, since the front-end side of the sheet P is held, the attitude of the sheet P is hardly changed, and the rear-end side is made difficult to hang down, by the stiffness of the sheet P, as compared with a configuration (fourth configuration) where the front-end side of the sheet P is not held, and is in the free state.

Therefore, the rear surface PB of the sheet P is hardly contacted with the ventilation plate 180 as compared with the above-described fourth configuration. As compared with the above-described fourth configuration, consequently, the rear surface PB of the sheet P is hardly heated, and the influence caused by the heat that is received from the rear surface PB of the sheet P is reduced.

(Modification of Chain Gripper 66)

Figure 7:
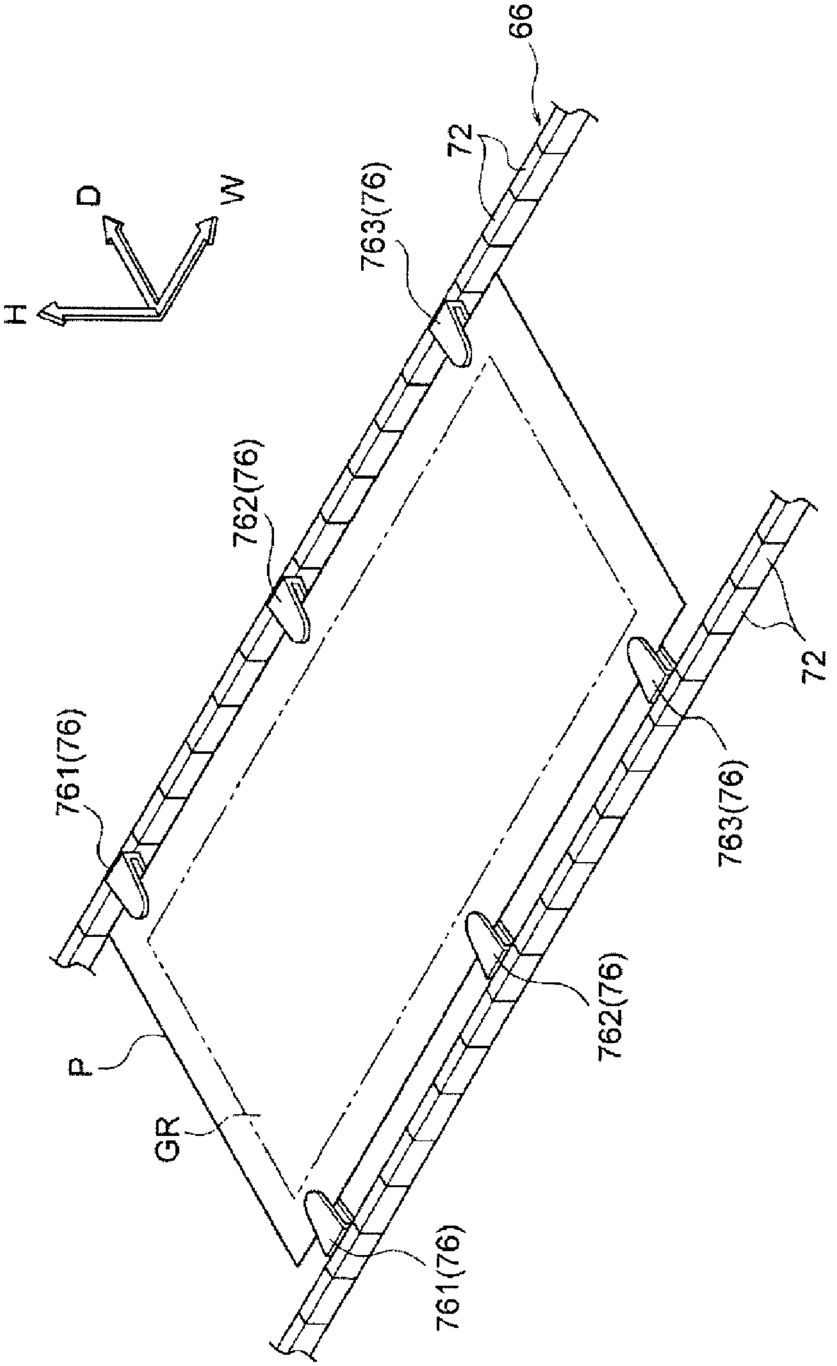
FIG. 7 is a perspective view showing a modification of a chain gripper.

Although, in the chain gripper 66 in the exemplary embodiment, the grippers 76 that are an example of the holding section hold the front-end side of the sheet P, the invention is not limited to this. The holding section may have a configuration where, as shown in FIG. 7, the section holds the front- and rear-end sides of the sheet P. The rear-end side of the sheet P means a portion which is upstream (the rear side) of the middle of the sheet P in the feeding direction.

In the configuration shown in FIG. 7, a total of six grippers 76 or pairs of grippers 761, 762, 763 are configured as one set. In each of the pairs, the two grippers are placed on the pair of chains 72, respectively. On each of the chains 72, the corresponding grippers 761, 762, 763 are arranged at predetermined intervals in the circumferential direction (circular direction) of the chain 72.

The grippers 761 clamp and hold respectively the front-end sides of the side portions of the sheet P, and the grippers 763 clamp and hold respectively the rear-end sides of the side portions of the sheet P. Moreover, the grippers 762 which are between the grippers 761, 763 clamp and hold respectively parts that are in the side portions of the sheet P, and that are in the middle portion in the feeding direction. Alternatively, the grippers 762 may be omitted, and a total of four grippers 761, 763 may be configured as one set.

Alternatively, only the grippers 761 may clamp the front-end portions of the front-end sides of the sheet Pin a similar manner as FIG. 4.

According to the configuration shown in FIG. 7, when the sheet P is fed while the front surface PA is opposed to the heating section 102, the distance between the front-end side of the sheet P and the heating section 102, and that between the rear-end side of the sheet P and the heating section 102 are less dispersed as compared with the case where the grippers 76 hold only the front-end side of the sheet P.

The modification may have a configuration where the air blowers 160 and the ventilation plate 180 are not used. In the modification, the grippers 762, 763 may hold the sheet P, whereby the non-contact state is maintained so that the sheet P is fed in the state where the rear surface PB in the image region GR of the sheet P is in the non-contact state. In this case, the grippers 762, 763 function as an example of the maintaining section. A configuration may be employed where the rear surface PB in the image region GR of the sheet P is temporarily contacted with a constituting portion of the apparatus.

In the modification, the recess 148 is formed at positions that are in the outer circumferential surface of the pressurizing roller 140, and that correspond to the grippers 761, 762, 763. Therefore, plural recesses 148 are formed at positions that are in the outer circumferential surface of the pressurizing roller 140, and on the both axial end sides, and at intervals in the circumferential direction of the pressurizing roller 140 in accordance with the intervals of the grippers 761, 762, 763 in the circumferential direction (circular direction) of the chain 72.

Other Modifications

Although, in the exemplary embodiment, the sheet P is used as an example of the recording medium, the invention is not limited to this. For example, a film or the like may be used as an example of the recording medium. A sheet-like member that is other than the sheet P, and that is formed into a sheet-like shape (a paper-like shape or a film-like shape) may be used as an example of the recording medium.

Although, in the exemplary embodiment, the chain gripper 66 that is used as an example of the feeding section feeds the sheet P to the secondary transfer position NT, causes the sheet P to pass through the heating section 102, and then feeds the sheet to the fixing unit 120, the invention is not limited to this. A feeding section such as a chain gripper to which the sheet P that has passed through the secondary transfer position NT is delivered, which causes the sheet P to pass through the heating section 102, and which then feeds the sheet to the fixing unit 120 may be used as an example of the feeding section. In this case, the sheet is fed to the secondary transfer position NT by another feeding section (for example, feeding rollers).

Although, in the exemplary embodiment, the air blowers 160 blow air to the rear surface PB of the sheet P in the thickness direction of the sheet P, the invention is not limited to this. For example, the air blowers 160 may blow air to the rear surface PB of the sheet P in a direction obliquely toward the upstream in the feeding direction of the sheet P (the obliquely upper right side in FIG. 3).

Figure 8:
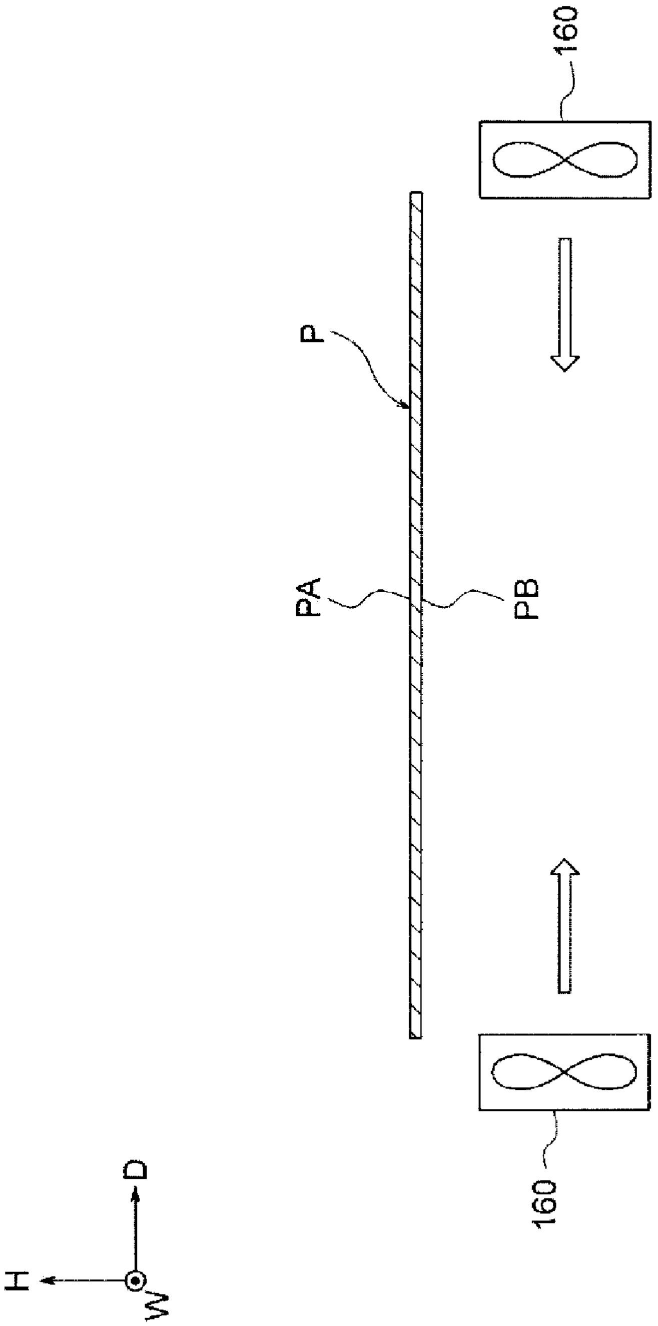
FIG. 8 is a side view showing a modification of air blowers.

A further configuration may be employed where, as shown in FIG. 8, the air blowers 160 are placed in the outer sides in the width direction of the sheet P, and air is blown from the sides of the both side ends of the sheet P to the rear surface PB of the sheet P. In other words, a configuration where air is supplied to the rear surface PB of the sheet P so that the sheet P rises may be employed.

Although, in the exemplary embodiment, air is supplied only to the rear surface PB of the sheet P, the invention is not limited to this. The case where air is supplied to the front surface PA of the sheet P may be allowed from the following viewpoints.

Figure 9:
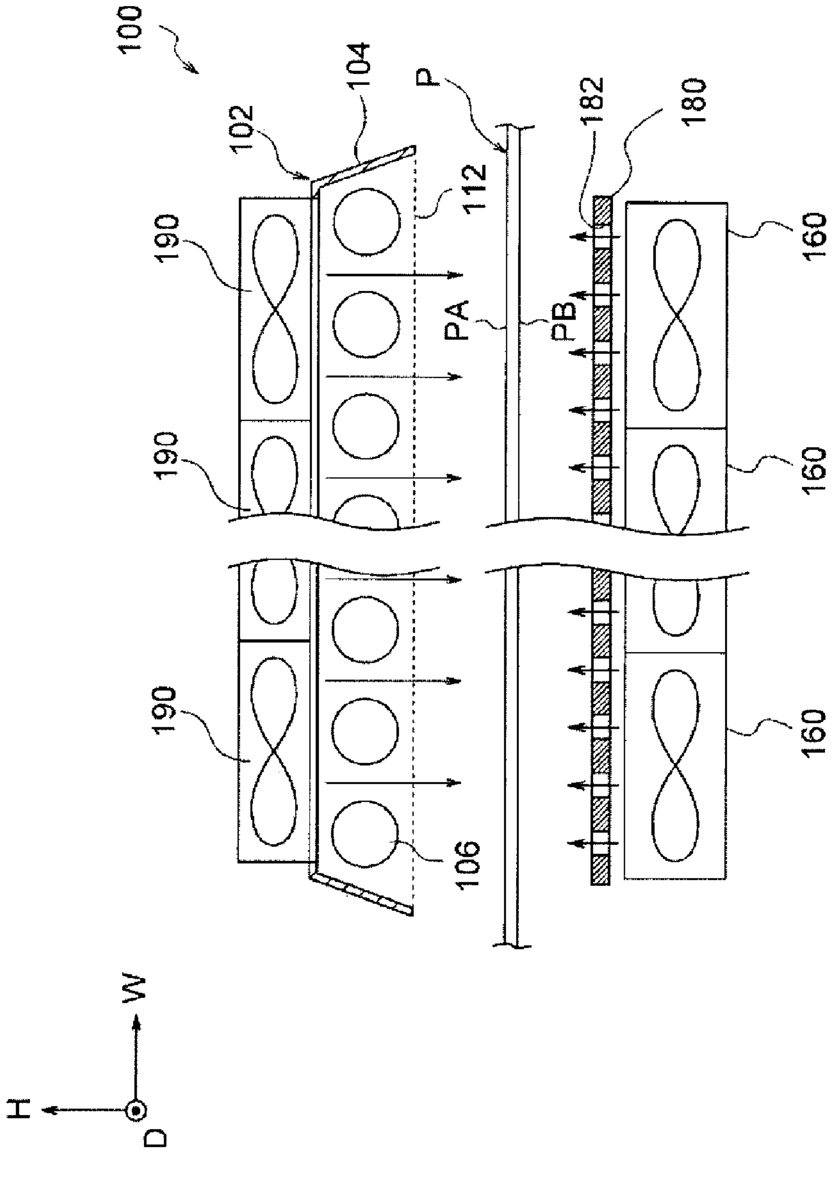
FIG. 9 is a schematic diagram showing the configuration of Modification 1.

The example shown in FIG. 9 is Modification 1 in which air is supplied to the front surface PA from the viewpoint of stable feeding of the sheet P. In addition to the configuration of the exemplary embodiment shown in FIG. 3, Modification 1 has air blowers 190 that are placed so to be opposed to the front surface PA of the sheet P, and that are used for supplying air to the front surface PA. The relative air volume between the air blown from the air blowers 190 and that blown from the air blowers 160 is adjusted, and the attitude of the sheet P is maintained in parallel with the feeding direction. In this case, from the viewpoint that dry toner is used, the volume of the air blown by the air blowers 190 is set to a value which is smaller than the volume of the air blown by the air blowers 160, and at which the toner is not scattered by the air blown by the air blowers 190.

Figure 10:
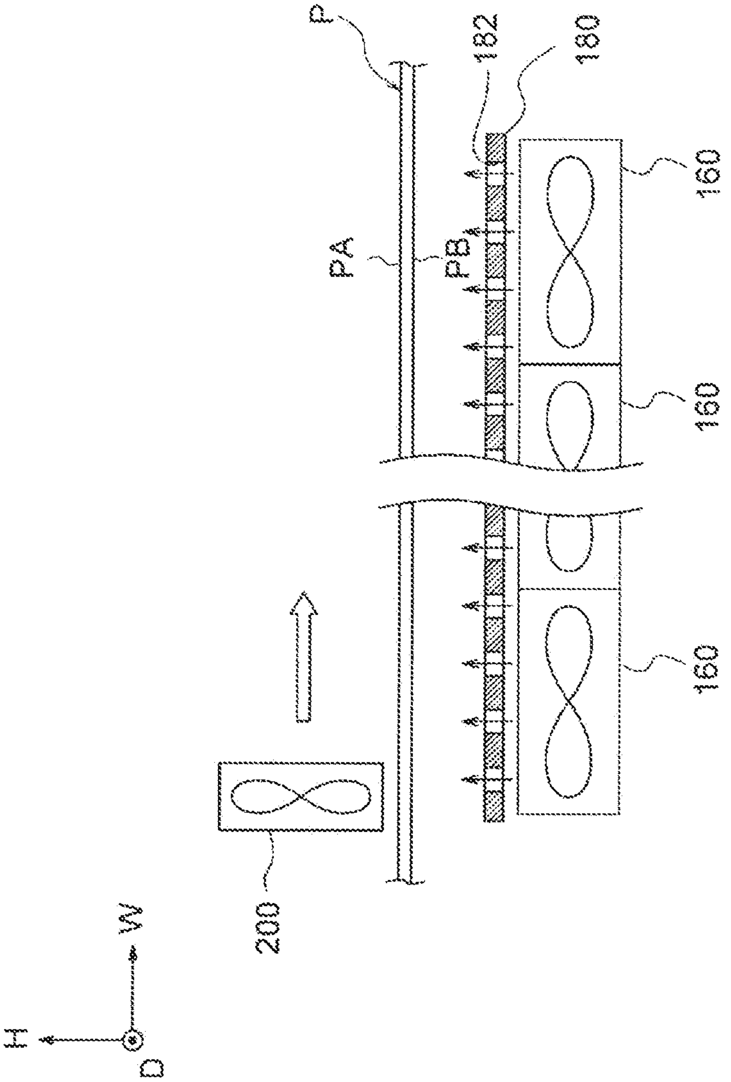
FIG. 10 is a schematic diagram showing the configuration of Modification 2.

In Modification 2 shown in FIG. 10, in order to ventilate the air in the vicinity of the heating section 102, an air blower 200 is disposed so as to be directed in a direction perpendicular to the blowing direction of the air blowers 160. That is, the air blower 200 is disposed so that the blow-out port of the air blower is opened in the direction along the front surface PA of the sheet P, and not directed to the front surface PA of the sheet P. There is a possibility that air blown from the air blower 200 flows in the direction along the front surface PA of the sheet P, and the air blown by the air blower 200 is supplied to the front surface PA of the sheet P. Also in this case, similarly with Modification 1, the volume of the blown air may be set to a value at which scattering of the toner does not occur.

The exemplary embodiment has been described by means of the mode where the air blowers 160 blow air to the rear surface PB of the sheet P in the thickness direction of the sheet P. In the case where a recording medium does not exist between the heating section 102 and the air blowers 160, when the air blowing is performed by the air blowers 160, there arises a problem that the warmed air in the periphery of the heating section 102 is distributed in the apparatus. As a countermeasure against this, the air blowers 160 are controlled so as to blow air at the timing when the recording medium is opposed to the air blowers 160, and the blown air is blocked by the recording medium. In other words, in the interval between preceding and succeeding recording media, the air blowing is weakened or stopped, whereby the volume of the air that is blown by the air blowers 160, and that is supplied to the heating section 102 is reduced, with the result that the warmed air is prevented from being distributed in the apparatus. The driving of the air blowers 160 may be controlled as described above, or the plural air blowers 160 are individually driven controlled.

The invention is not limited to the above-described exemplary embodiment, various modifications, changes, and improvements may be made without departing from the spirit of the invention. For example, an appropriate combination of plural the above-described modifications may be configured.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

REFERENCE SIGNS LIST

10 image forming apparatus
12 image forming section
66 chain gripper (example of feeding section)
76 gripper (example of holding section)
80 reversing mechanism
100 fixing device (example of pressurizing section)
102 heating section
130 heating roller (example of heating member)
139 butted portion
140 pressurizing roller (example of pressurizing member)
149 butting portion
160 air blower (example of maintaining section, example of air blowing section)
180 ventilation plate (example of ventilating section)
182 ventilation holes
190 air blower (example of maintaining section, example of air blowing section)
200 air blower
GR image region
P sheet (example of recording medium)
PA front surface
PB rear surface

What is claimed is:

1. A fixing device comprising:

a first heater that heats a front surface of a recording medium in a non-contact manner;

a second heater that is downstream of the first heater, that pressurizes the recording medium that is heated by the first heater, and feeds the recording medium while causing the front surface to be opposed to a heating part; and a blower that blows air to a rear surface of the recording medium so that the air is not blown to a front surface of the recording medium having an unfixed image, wherein the recording medium is fed by the second heater; and a feeder that feeds the recording medium while causing the front surface to be opposed to the first heater, and that holds and feeds the recording medium from the first heater to the second heater.

2. The fixing device according to claim 1, wherein the blower is configured so that a blow-out port is opposed only to the rear surface of the recording medium, and not opposed to the front surface.

3. The fixing device according to claim 1, wherein a distance between the second heater and the first heater is shorter than a distance between the second heater and the blower.

4. The fixing device according to claim 3, wherein the first heater comprises a heating source, and a distance between the second heater and the heating source is shorter than the distance between the second heater and a downstream end of a blowing region formed by the blower in a feeding direction of the recording medium.

5. The fixing device according to claim 1, wherein the fixing device further comprises a holder that is in the second heater, and that holds at least a front-end side of the recording medium.

6. The fixing device according to claim 1, wherein the fixing device further comprises a ventilating section having a plurality of ventilation holes through which the air that is blown from the blower toward the rear surface of the recording medium passes.

7. An image forming apparatus comprising:

an image forming section that forms an image on the recording medium;

the fixing device according to claim 1, the fixing device being configured to fix the image that is formed by the image forming section to the recording medium; and a reversing mechanism that reverses the recording medium to which an image is fixed by the fixing device.

8. The fixing device according to claim 1, further comprising:

a ventilating section having a plurality of ventilation holes through which the air that is blown from the blower toward the rear surface of the recording medium passes, wherein the blower is configured to blow the air to the plurality of ventilation holes and the rear surface between the plurality of ventilation holes.

9. The fixing device according to claim 8, wherein the ventilation holes are in a two-dimensional pattern.

* * * * *